United States Patent
Yang et al.

(10) Patent No.: US 10,768,077 B2
(45) Date of Patent: Sep. 8, 2020

(54) SEMI-DRY TYPE METHOD FOR AUTOMATICALLY SAMPLING PM2.5 PARTICLES

(71) Applicant: JUSUN INSTRUMENTS CO., LTD., New Taipei (TW)

(72) Inventors: Yu-Shan Yang, New Taipei (TW); Chuen-Jinn Tsai, Hsinchu County (TW); Kang-Chieh Fan, New Taipei (TW)

(73) Assignee: JUSUN INSTRUMENTS CO., LTD., New Taipei (TW)

( * ) Notice: Subject to any disclaimer, the term of this patent is extended or adjusted under 35 U.S.C. 154(b) by 182 days.

(21) Appl. No.: 16/134,382

(22) Filed: Sep. 18, 2018

(65) Prior Publication Data

US 2020/0033235 A1    Jan. 30, 2020

(30) Foreign Application Priority Data

Jul. 25, 2018  (TW) .............................. 107125784 A

(51) Int. Cl.
| | | |
|---|---|---|
| *G01N 1/22* | (2006.01) | |
| *G01N 1/38* | (2006.01) | |
| *G01N 15/06* | (2006.01) | |

(52) U.S. Cl.
CPC .............. *G01N 1/2202* (2013.01); *G01N 1/38* (2013.01); *G01N 2001/383* (2013.01)

(58) Field of Classification Search
CPC ...... G01N 1/22; G01N 1/2202; G01N 1/2247; G01N 1/38–40; G01N 15/06; G01N 27/68–70; G01N 2001/383
See application file for complete search history.

(56) References Cited

U.S. PATENT DOCUMENTS

| | | | | |
|---|---|---|---|---|
| 5,914,454 | A  * | 6/1999 | Imbaro .............. | B01D 53/1418 |
| | | | | 261/79.2 |
| 6,508,864 | B2 * | 1/2003 | Day ..................... | G01N 1/2211 |
| | | | | 95/219 |
| 6,688,187 | B1 * | 2/2004 | Masquelier .......... | G01N 1/2214 |
| | | | | 73/863.22 |
| 6,955,075 | B2 * | 10/2005 | Carlson ..................... | B03C 3/32 |
| | | | | 73/28.02 |
| 9,671,320 | B2 | 6/2017 | Yang et al. | |
| 10,208,331 | B2 * | 2/2019 | Ensor .................... | B82Y 15/00 |
| 10,401,264 | B2 * | 9/2019 | Tsai ..................... | G01N 1/2214 |

(Continued)

*Primary Examiner* — Nguyen Q. Ha
(74) *Attorney, Agent, or Firm* — Muncy, Geissler, Olds & Lowe, P.C.

(57) ABSTRACT

A semi-dry type method for automatically sampling PM2.5 particles. The method collects an aerosol sample in a dry mode and extracts it in a wet mode to prevent sampling artifacts. In the dry mode, a first stage utilizes carbon brushes as discharge electrodes to charge aerosol particles which are then collected on a cylinder wall by an electric field setup between a high-voltage central metal rod and a grounded cylinder in a second stage. In the wet mode, deionized (DI) water is injected into an electrostatic particle-into-liquid sampler (EPILS) in a pulsation manner by opening and closing solenoid valves intermittently, which dislodges aerosol particles deposited on the cylinder wall effectively to become a liquid aerosol sample. The liquid aerosol sample is then analyzed for chemical compositions automatically.

3 Claims, 6 Drawing Sheets

(56) References Cited

U.S. PATENT DOCUMENTS

| | | | |
|---|---|---|---|
| 2003/0136205 A1* | 7/2003 | Totoki | G01N 15/0211 73/864.71 |
| 2006/0110818 A1* | 5/2006 | Hill | G01N 15/06 435/287.1 |
| 2006/0123752 A1* | 6/2006 | Symonds | B04C 3/02 55/434.2 |
| 2007/0113685 A1* | 5/2007 | Zaromb | G01N 1/2214 73/863.21 |
| 2008/0047373 A1* | 2/2008 | Ahn | G01N 15/0266 73/865.5 |
| 2009/0139399 A1* | 6/2009 | Kang | B01D 47/06 95/24 |
| 2009/0199623 A1* | 8/2009 | Mertler | G01N 15/0266 73/61.71 |
| 2014/0020558 A1* | 1/2014 | Gururaja Rao | B03C 3/011 95/69 |
| 2019/0154550 A1* | 5/2019 | Wu | G01N 33/54366 |

* cited by examiner

SEMI-DRY TYPE METHOD FOR AUTOMATICALLY SAMPLING PM2.5 PARTICLES

BACKGROUND OF THE INVENTION

Field of the Invention

The present invention relates generally to a sampling method, and more particularly to a semi-dry type method for automatically sampling $PM_{2.5}$ particles.

Description of the Prior Art $PM_{2.5}$ air quality and chemical composition will fluctuate with the changes in meteorological conditions and pollution sources. Conventionally, it relies on manual sampling and analysis to monitor $PM_{2.5}$ in the air. It leads to the defect that only daily average concentrations can be acquired. Hourly fluctuation of pollutants in the air cannot be observed using the conventional method.

Some commercially available instruments such as MAGRA, IGAC or AIM, which are based on the SJAC (steam-jet aerosol collector) and PILS (particle-into-liquid sampler), are used for determining the concentrations of inorganic soluble ions. Due to the application of high temperature vapor, previous studies have indicated that these sampling systems underestimate the concentrations of precursor gases ($NH_3$ and $SO_2$) and some ion species ($Na^+$, $NH_4^+$, $Cl^-$, $NO_3^-$, and $SO_4^{2-}$) comparing to those of the standard method.

U.S. Pat. No. 9,671,320 discloses a semi-dry type electrostatic cyclone sampler to collect charged particles with the help of the corona discharge and electric field in a dry mode and dislodges the collected particles in a wet mode when the corona discharge is turned off. However, the collecting surface for the particles is also the grounded electrode for the corona discharge. The particles collected on the surface will increase the resistance of the corona discharge and lower the current thereof, which will lead to reduction in particle collection efficiency. Besides, aerosol is introduced into the charging chamber in a tangential direction of its cylinder wall so that the aerosol flows in the chamber in the spiral manner. The particles in the spirally-flowing aerosol have higher chance to collide the discharge electrode or to attach to surfaces other than the desired collecting surface. Sampling artifacts are thus occurred.

Besides, to ensure higher collecting efficiency, the sampler disclosed in U.S. Pat. No. 9,671,320 needs to be operated at higher working voltage, which can easily lead to higher radicals and ozone concentrations. The radicals and ozone further lead to high background concentrations of $NH_4^+$ and $NO_3^-$ and thus causes sampling artifacts in later analysis.

SUMMARY OF THE INVENTION

One objective of the present invention is to provide a sampling method which can achieve high collection efficiency and low sampling artifact.

Another objective of the present invention is to provide an automaticalized method to collect and analyze particles.

To achieve the above and other objects, the present invention provides a semi-dry type method for automatically sampling $PM_{2.5}$ particles which utilizes an automatic sampling system. The automatic sampling system includes a main controller, a first high voltage power supply, a second high voltage power supply, a mass flow controller, a syringe pump assembly, a water sample analyzer and a semi-dry type electrostatic sampler. The main controller is signally connected to the first high voltage power supply, the second high voltage power supply, the mass flow controller and the syringe pump assembly. The syringe pump assembly includes at least one water injecting syringe, a sampling syringe and a plurality of injecting pumps. The injecting pumps is adapted to pump water into the water injecting syringes and the sampling syringe and to injecting water from the water injecting syringes and the sampling syringe, respectively. The semi-dry type electrostatic sampler includes a main body, a discharge electrode and a conductive rod. The main body has an aerosol inlet on a top side, an aerosol outlet on a bottom side, a water outlet on the bottom side, a cylinder wall and at least one water injecting opening formed on the cylinder wall. The cylinder wall defines a particle charging area communicating with the aerosol inlet. The cylinder wall also defines a particle collecting area communicating with the aerosol outlet. The water injecting opening is communicated with the particle charging area. The particle collecting area is communicated with and located downstream of the particle charging area. The cylinder wall is made of conductive material. The at least one water injecting opening is communicated with the at least one water injecting syringe. The water outlet is communicated with the sampling syringe. The discharge electrode is disposed in the particle charging area and located below the aerosol inlet. The discharge electrode has at least one carbon fiber brush for corona discharge. The carbon fiber brush has a plurality of carbon fiber strips. The discharge electrode is electrically connected to the first high voltage power supply. The conductive rod is disposed in the particle collecting area. The conductive rod is electrically connected to the second high voltage power supply. The semi-dry type method for automatically sampling $PM_{2.5}$ particles includes the following steps:

Sample collecting: introducing $PM_{2.5}$ aerosol into the particle charging area and the particle collecting area via the aerosol inlet, in which a flow rate of the $PM_{2.5}$ aerosol is regulated by the mass flow controller; providing high voltage power using the first high voltage power supply to the discharge electrode in a manner that the at least one carbon fiber brush discharges corona and thus charges $PM_{2.5}$ particles in the $PM_{2.5}$ aerosol; providing high voltage power using the second high voltage power supply to the conductive rod to form an electric field between the conductive rod and the cylinder wall in a manner that at least a part of the charged $PM_{2.5}$ particles are attached to the cylinder wall;

Semi-dry type electrostatic sampler shutting down: stopping introducing the $PM_{2.5}$ aerosol into the particle charging area and the particle collecting area, and ceasing the first and second high voltage power supplies;

Water sampling: using at least one of the injecting pumps to inject deionized water from the at least one water injecting syringe into the main body via the at least one water injecting opening in a manner that the $PM_{2.5}$ particles attached on the cylinder wall are dislodged and a water sample is generated; using another injecting pump to pump the water sample from the main body into the sampling syringe via the water outlet;

Water sample analyzing: using the injecting pump to inject the water sample from the sampling syringe into the water sample analyzer.

The main body of the present invention is divided into a particle charging area and a particle collecting area so that most of particles can be collected in the particle collecting area. This two stage design enables lower working voltage for the fine carbon brushes discharge electrode to discharge corona. Therefore, the concentrations of generated ozone and radicals are reduced such that $NH_4^+$ and $NO_3^-$ sampling artifacts can thus be lowered.

DETAILED DESCRIPTION OF THE PREFERRED EMBODIMENTS

Figure 1:
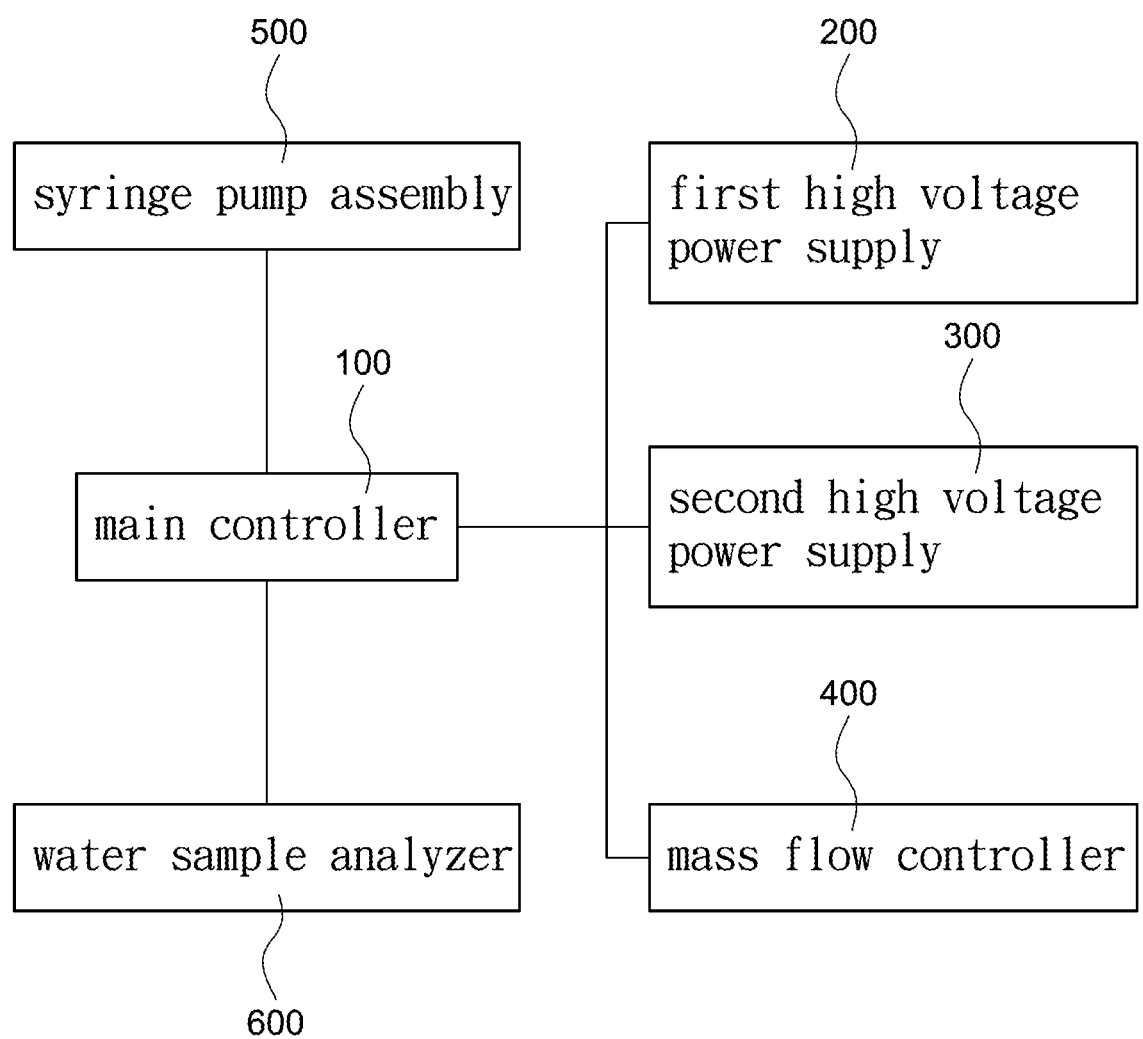
FIG. 1 is a component diagram showing an automatic sampling system in accordance with an embodiment of the present invention.

Please refer to FIG. 1 to FIG. 6. The semi-dry type method of the present invention utilizes an automatic sampling system to automatically sample $PM_{2.5}$ particles. The automatic sampling system includes a main controller 100, a first high voltage power supply 200, a second high voltage power supply 300, a mass flow controller 400, a syringe pump assembly 500, a water sample analyzer 600 and a semi-dry type electrostatic sampler 700, hereinafter referred to as "sampler".

The main controller 100 is, for example, a computer or other electronic devices with data computing capabilities. The main controller 100 is signally connected to the first and second high voltage power supplies 200, 300, the mass flow controller 400, the syringe pump assembly 500 and water sample analyzer 600. The main controller 100 can output control signals to these devices, respectively.

The syringe pump assembly 500 includes three water injecting syringes 501, a sampling syringe 502 and a plurality of injecting pumps 503, 504. The injecting pumps 503, 504 is interactive with the pistons of the syringes 501, 502 so as to draw water into or inject water from the syringes 501, 502.

The sampler has a main body 10, a discharge electrode 20, a conductive rod 30 and an insulating casing 40.

The main body 10 is made of conductive material such as stainless steel. The main body has an aerosol inlet 11 on a top side, an aerosol outlet 12 on a bottom side, a water outlet 13 on the bottom side, an cylinder wall 14, a plurality of water injecting opening 15 formed on the cylinder wall 14, and a clean air inlet 16 also formed on the cylinder wall 14. To facilitate the installation of the discharge electrode 20 and the conductive rod 30, the cylinder wall 14 can be divided into several assemblable parts. The cylinder wall 14 defines a particle charging area Z1 and a particle collecting area Z2. The particle charging area Z1 is communicated with the aerosol inlet. The particle collecting area Z2 is communicated with and located downstream of the particle charging area Z1. When the sampler is working, the cylinder wall 14 is grounded such that the cylinder wall 14 can have a polarity opposite to that of the discharge electrode 20 and the conductive rod 30. To separately collect gas sample and water sample, the aerosol outlet 12 is not directly communicated with the water outlet 13. Instead, the aerosol outlet 12 and the water outlet 13 are communicated with the particle collecting area Z2 respectively.

In the present embodiment, the main body 10 has a gas tube disposed at its bottom end, in which a top end of the gas tube is higher than the water outlet 13, and the aerosol outlet 12 is defined in the gas tube. The water injecting opening 15 and the clean air inlet 16 are both communicated with the particle charging area Z1 to introduce water jet and clean air jet respectively. To increase the flushing efficiency, the water injecting opening 15 and the clean air inlet 16 can be designed to introduce the water jet and the clean air jet in a tangential direction of the cylinder wall 14, such that the introduced water can be formed as a water film on the cylinder wall 14 and spirally flush downward. The water can be injected by syringe pumps. Solenoid valves can be utilized to accumulate water pressure before releasing the water so as to create pulse water flows. In other possible embodiments, there can be only one water injecting opening formed on the cylinder wall.

The discharge electrode 20 is disposed at the center of the particle charging area Z1 and located below the aerosol inlet 11. Because aerosol can be axially introduced into the sampler via the aerosol inlet 11, the aerosol can flow substantially through the particle charging area Z1 and the particle collecting area Z2 in an axial direction. Thus the particles in the aerosol have lower chance to collide the discharge electrode 20 nor attach to locations other than the cylinder wall. In the present embodiment, the discharge electrode 20 has an iron rod 21 and a plurality of carbon fiber brushes 22. The carbon fiber brushes 22 each has a plurality of carbon fiber strips substantially parallel to each other. The carbon fiber brushes 22 electrically connect to the iron rod 21. In the present embodiment, the insulating casing 40 substantially encapsulates the iron rod 21 so that the discharge electrode 20 can be shielded in the air-flowing direction to prevent particles from attaching thereto. The carbon fiber brushes 22 extend downward from the insulating casing 40. The discharge electrode 20 can be applied with high voltage power to create an electric field between the discharge electrode 20 and the cylinder wall 14 in a manner that the discharge electrode 20 can generate corona. Ion cloud can be formed between the carbon fiber brushes 22 and the cylinder wall 14 to ionize the particles passing through the particle charging area Z1. For instance, the particles can be charged with positive ions.

The conductive rod 30 is disposed at the center of the particle collecting area Z2 and located beneath the discharge electrode 20. The conductive rod 30 can also be applied with high voltage power having the same polarity with the charged particles so that the grounded cylinder wall 14 has an opposite polarity to attract and collect the charged particles. The high voltage power applied to the conductive rod 30 is intentionally designed to be insufficient to generate corona. Preferably, the conductive rod 30 has insulators 31, 32 on its top end and its bottom end to mitigate electronic field interference. Insulated supporters can also be utilized to support the discharge electrode 20 and the conductive rod 30 within the main body 10 respectively.

The power supplies are used to supply high voltage power to the discharge electrode 20 and the conductive rod 30, respectively. It is noticeable that the voltage applied to the discharge electrode 20 should be higher than its corona inception voltage so that the discharge electrode 20 can discharge corona. The voltage applied to the conductive rod 30 is normally lower than its corona inception voltage to prevent corona.

Figure 2:
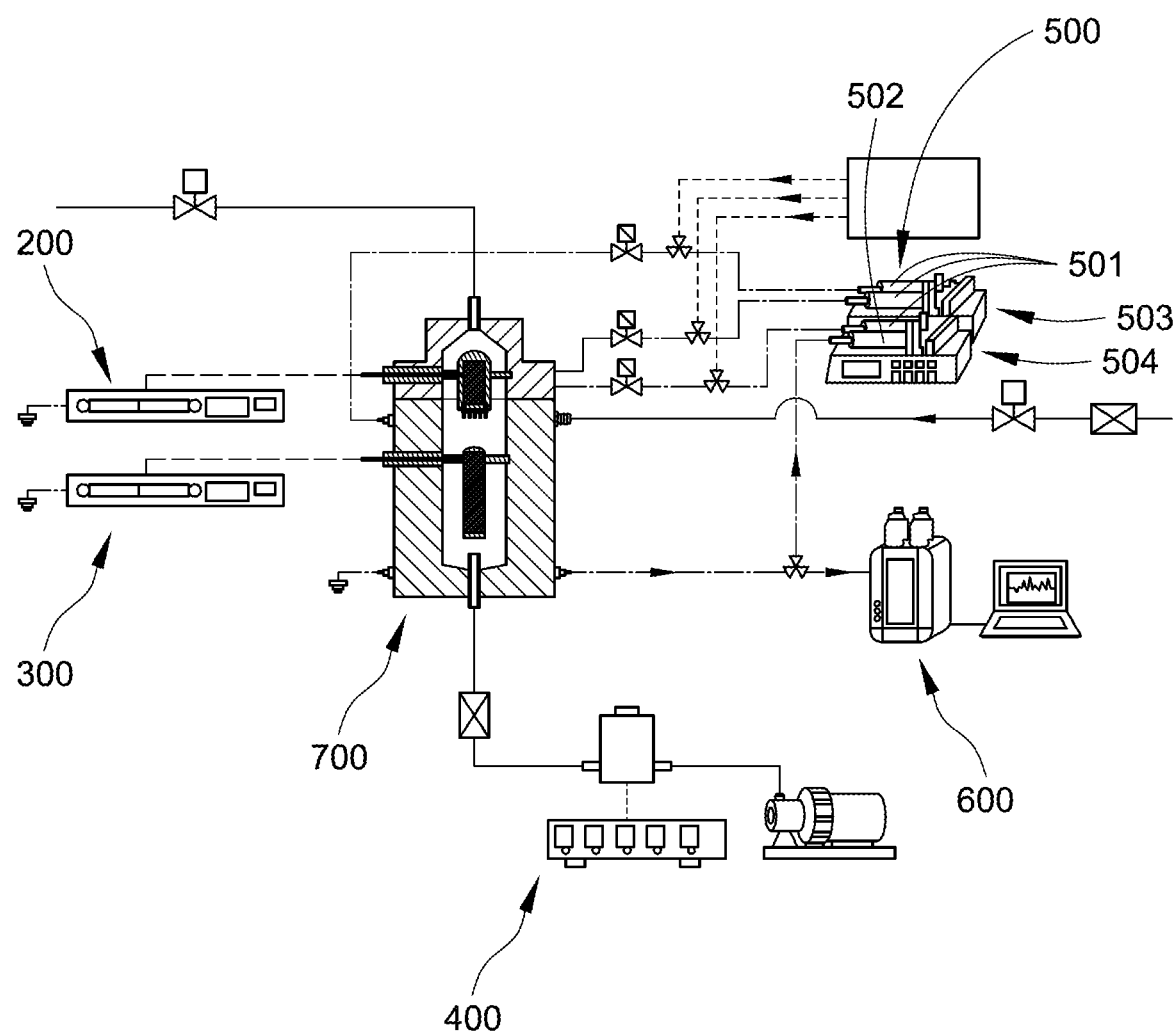
FIG. 2 is another component diagram showing the automatic sampling system in accordance with the embodiment of the present invention.
Figure 3:
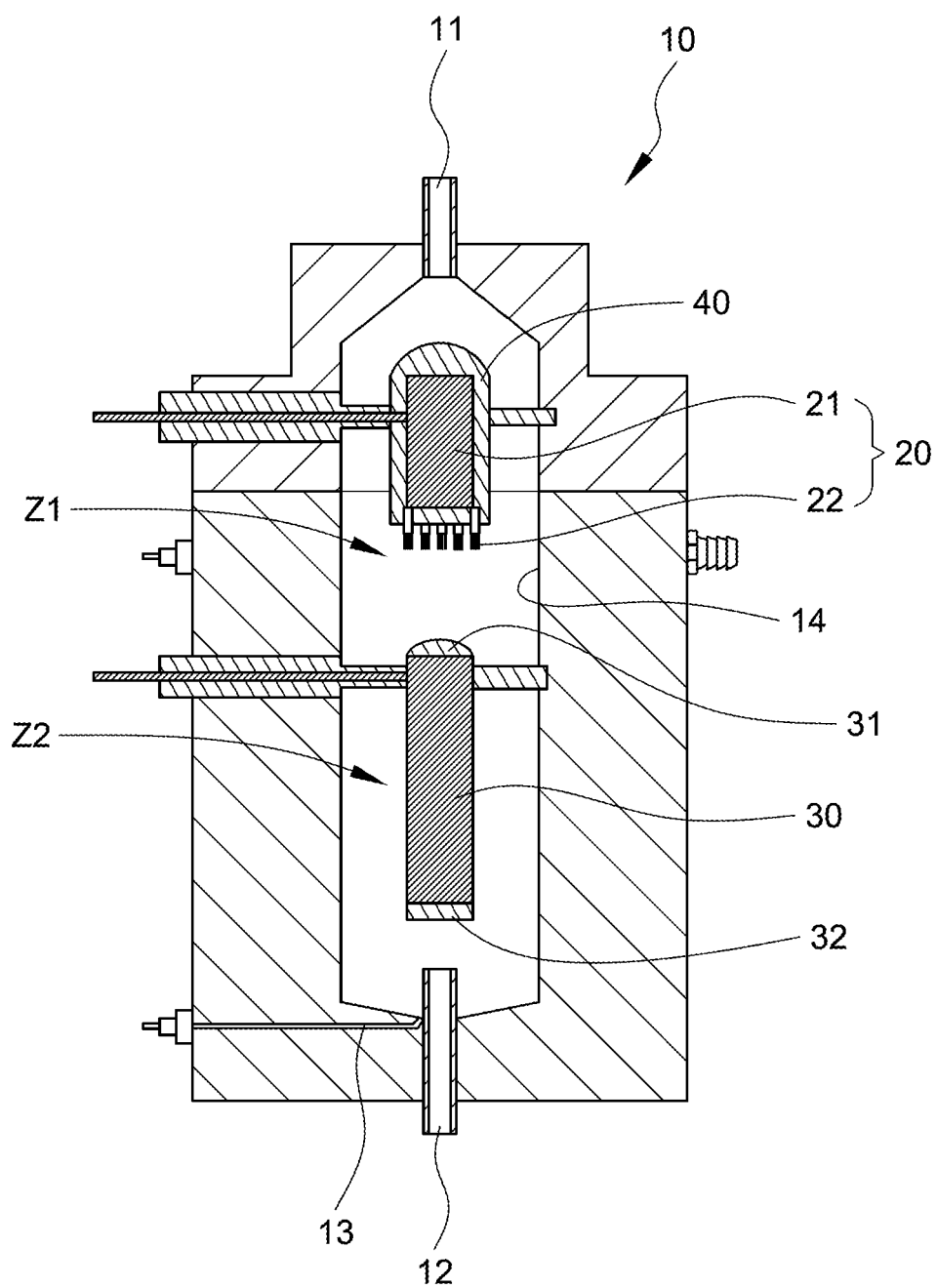
FIG. 3 is a longitudinal profile showing a sampler in accordance with the embodiment of the present invention.
Figure 4:
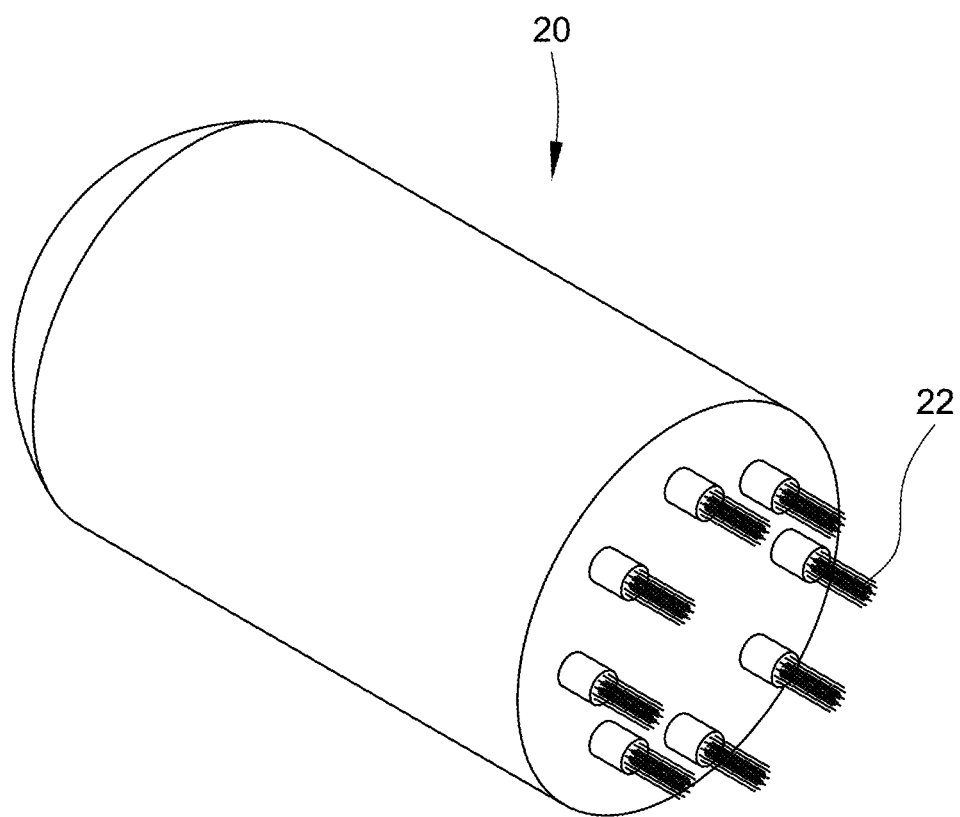
FIG. 4 is a perspective view showing a discharge electrode in accordance with the embodiment of the present invention.
Figure 5:
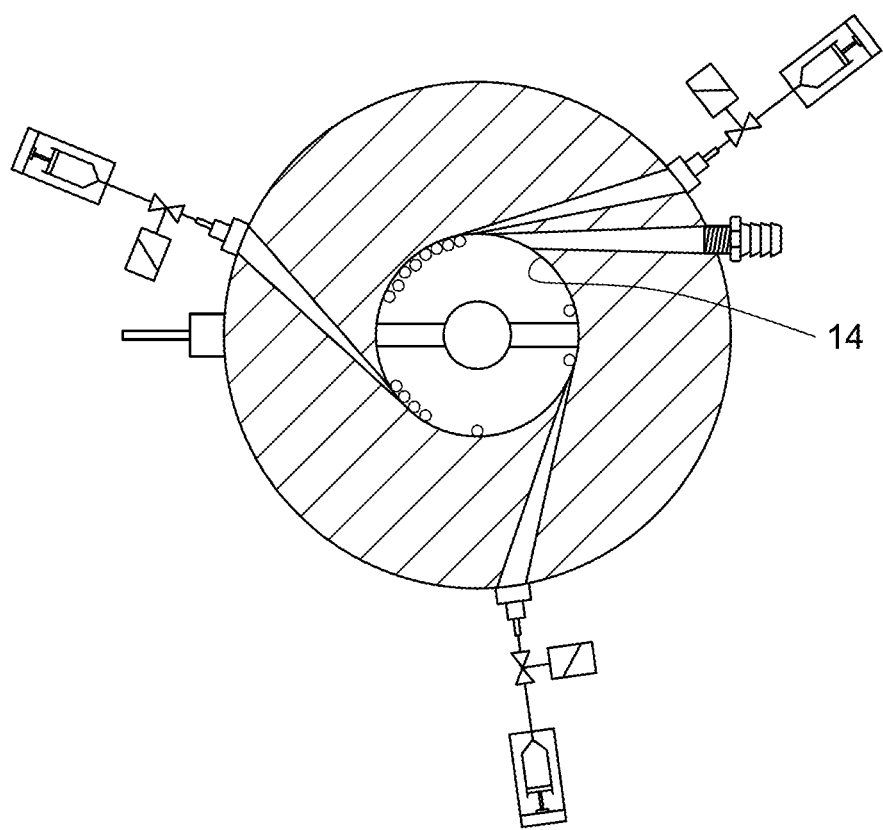
FIG. 5 is a cross section showing the sampler in the sample collecting step in accordance with the embodiment of the present invention.
Figure 6:
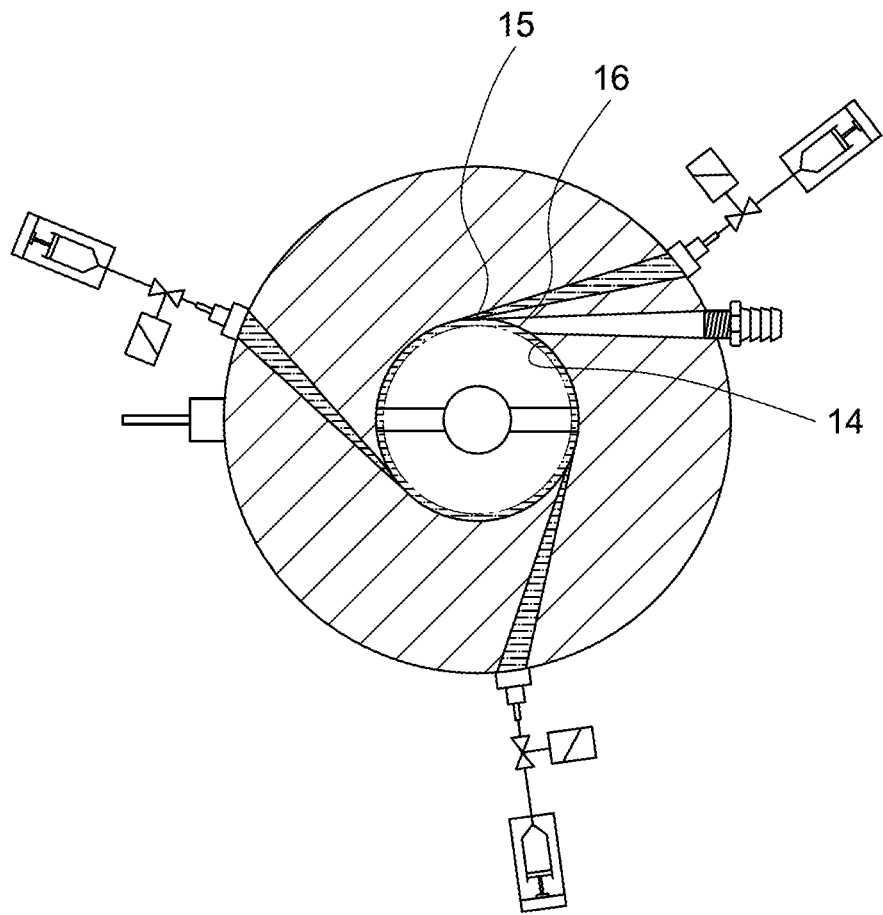
FIG. 6 is a cross section showing the sampler in the water sampling step in accordance with the embodiment of the present invention, in which the sampler is working in a wet mold.

The semi-dry type method of the present embodiment includes the following steps:

Sample collecting: introducing $PM_{2.5}$ aerosol using a vacuum pump into the particle charging area Z1 and the particle collecting area Z2 via the aerosol inlet 11, in which a flow rate of the $PM_{2.5}$ aerosol is regulated by the mass flow controller 400; providing high voltage power using the first high voltage power supply 200 to the discharge electrode 20 in a manner that the at least one carbon fiber brush 22 discharges corona and thus charges $PM_{2.5}$ particles in the $PM_{2.5}$ aerosol; providing high voltage power using the second high voltage power supply 300 to the conductive rod 30 to form an electric field between the conductive rod 30 and the cylinder wall 14 in a manner that at least a part of the charged $PM_{2.5}$ particles are attached to the cylinder wall 14, as shown in FIG. 5. To reduce the generation of ozone, the voltage applied to the discharge electrode 20 should not be too high. Within tolerable sampling error range, the ozone generated when the discharge electrode 20 and the conductive rod 30 are working should be less than 100 ppb so as to reduce the generation of $NH_4^+$ and $NO_3^-$;

Semi-dry type electrostatic sampler shutting down: stopping introducing the $PM_{2.5}$ aerosol into the particle charging area and the particle collecting area, ceasing the first and second high voltage power supplies, so that the high voltage of the discharge electrode 20 and the conductive rod 30 can be fully removed;

Water sampling: as shown in FIGS. 2 and 6, using the injecting pumps 503 to inject deionized water from the water injecting syringe 501 into the main body via the water injecting openings 15 in a manner that the PM2.5 particles attached on the cylinder wall 14 are dislodged and a water sample is generated; using another injecting pump 504 to pump the water sample from the main body into the sampling syringe 502 via the water outlet 13;

Water sample analyzing: using the injecting pump 504 to inject the water sample from the sampling syringe 502 into the water sample analyzer 600. In one possible embodiment, the water sample analyzer is an ion chromatography.

In one possible embodiment, the method can further include the following step after the water sampling step:

Main body drying: introducing dry air into the particle charging area and the particle collecting area so as to avoid affecting the accuracy of the next particle collection and analysis.

In an experiment, the discharge electrode 20 is working at 4000 V and the conductive rod 30 is working at 5000 V. The generated ozone is 70-90 ppb. Collection efficiency for nano particles can reach 92.4-98.6%. $NH_4^+$ and $NO_3^-$ are generated at concentrations of $4.2\pm1.65$ g/m$^3$ and $2.6\pm0.78$ μg/m$^3$ respectively.

In another experiment for ion recovery rate, nonvolatile particles of $Na_2SO_4$ and $(NH_4)_2SO_4$ and volatile particles of $NH_4NO_3$ are used. 1% (v/v) aqueous solutions are prepared using the afore-mentioned particles respectively. These solutions are then atomized by Atomizer Model 3076, TSI. The aerosol are then dried and static neutralized before entering the electrical classifier to prepare particles with single diameter of 70, 90, 110, 130 and 150 nm respectively. These particles are then introduced into a static neutralizer and thereafter divided into two flows which are introduced simultaneously into the sampler of the afore-mentioned embodiment and a Scanning Mobility Particle Sizer, TSI, Model 3934, respectively. Particles are thus sampled. Number concentrations obtained by the SMPS are then converted into mass concentration based on densities of different tested particles. The sample obtained by the sampler is analyzed by ion chromatography can compared with the result of the SMPS. Ion recovery rate for different ions are calculated. It is observed that the ion recovery rate for $Na_2SO_4$, $(NH_4)_2SO_4$ and $NH_4NO_3$ are very high when using the sampler of the above mentioned embodiment. The recovery rate of $Na^+$ and $SO_4^{2-}$ can reach $93\pm10\%$ ($R^2=0.98$) and $88\pm4.5\%$ ($R^2=0.99$) respectively. The recovery rate of $NH_4^+$ and $SO_4^{2-}$ can reach $105\pm18\%$ ($R^2=0.98$) and $92\pm5.6\%$ ($R^2=0.98$) respectively. The recovery rate of $NH_4^+$ and $NO_3^-$ can reach $103\pm15\%$ ($R^2=0.92$) and $96\pm8\%$ ($R^2=0.97$) respectively.

Compared the sampler of the present invention with the conventional PILS, the accuracy and correlation ration of the present invention are outstanding. This is so because PILS mixes aerosol with high temperature vapor during condensation, so that the surface temperature of the particles increases. Besides, their aqueous solutions are acidic with pH of 5.6, which causes 12-16% of $NH_4^+$ evaporation (Sorooshian et al., 2006, Li et al., 2017). When the concentration of $NO_3^-$ is lower than 2 μg/m$^3$, $NO_3^-$ becomes sticky and attach to the tube surface. The accuracy of PILS is thus reduced (Orsini et al., 2003). On the contrary, the sampler of the present invention utilizes electrostatic to collect particles. $NH_4^+$ evaporation caused by high temperature can be prevented. The result shows the error for $NH_4^+$ is lower than 10%. In addition, the particle loss of the sampler of the present invention is relatively low (less than 5% particle loss for particles with diameter of 14 nm-4 μm). Sticky particles can thus be effectively collected. It is verified that the accuracy and the correlation ration for low concentration $NO_3^-$ is more superior to PILS.

What is claimed is:

1. A semi-dry type method for automatically sampling $PM_{2.5}$ particles which utilizes an automatic sampling system, the automatic sampling system comprising:
   a main controller,
   a first high voltage power supply,
   a second high voltage power supply,
   a mass flow controller,
   a syringe pump assembly,
   a water sample analyzer, and
   a semi-dry type electrostatic sampler,
   the main controller being signally connected to the first high voltage power supply, the second high voltage power supply, the mass flow controller and the syringe pump assembly,
   the syringe pump assembly comprising:
   at least one water injecting syringe,
   a sampling syringe, and
   a plurality of injecting pumps,
   the injecting pumps being adapted to pump water into the water injecting syringes and the sampling syringe and to injecting water from the water injecting syringes and the sampling syringe, respectively;
   the semi-dry type electrostatic sampler comprising:
   a main body, having an aerosol inlet on a top side,
   an aerosol outlet on a bottom side,
   a water outlet on the bottom side,
   a cylinder wall, and
   at least one water injecting opening formed on the cylinder wall, the cylinder wall defining a particle charging area communicating with the aerosol inlet, the cylinder wall defining a particle collecting area communicating with the aerosol outlet, the at least one water injecting opening being communicated with the particle charging area, the particle collecting area being communicated with and located downstream of the particle charging area, the cylinder wall being made of conductive material, the at least one water injecting opening being communicated with the at least one water injecting syringe, the water outlet being communicated with the sampling syringe;

a discharge electrode, disposed in the particle charging area and located below the aerosol inlet, the discharge electrode having at least one carbon fiber brush for corona discharge, the carbon fiber brush having a plurality of carbon fiber strips, the discharge electrode being electrically connected to the first high voltage power supply; and a conductive rod, disposed in the particle collecting area, the conductive rod being electrically connected to the second high voltage power supply;

wherein, the semi-dry type method for automatically sampling $PM_{2.5}$ particles comprises the following steps:

sample collecting: introducing $PM_{2.5}$ aerosol into the particle charging area and the particle collecting area via the aerosol inlet, in which a flow rate of the $PM_{2.5}$ aerosol is regulated by the mass flow controller; providing high voltage power using the first high voltage power supply to the discharge electrode in a manner that the at least one carbon fiber brush discharges corona and thus charges $PM_{2.5}$ particles in the $PM_{2.5}$ aerosol; providing high voltage power using the second high voltage power supply to the conductive rod to form an electric field between the conductive rod and the cylinder wall in a manner that at least a part of the charged $PM_{2.5}$ particles are attached to the cylinder wall;

semi-dry type electrostatic sampler shutting down: stopping introducing the $PM_{2.5}$ aerosol into the particle charging area and the particle collecting area, ceasing the first and second high voltage power supplies;

water sampling: using at least one of the injecting pumps to inject deionized water from the at least one water injecting syringe into the main body via the at least one water injecting opening in a manner that the PM2.5 particles attached on the cylinder wall are dislodged and a water sample is generated; using another injecting pump to pump the water sample from the main body into the sampling syringe via the water outlet;

water sample analyzing: using the injecting pump to inject the water sample from the sampling syringe into the water sample analyzer.

2. The semi-dry type method of claim 1, wherein in the sample collecting step, ozone generated by the discharge electrode and the conductive rod is lower than 100 ppb.

3. The semi-dry type method of claim 1, further comprising the following step after the water sampling step:

main body drying: introducing dry air into the particle charging area and the particle collecting area.

* * * * *